May 16, 1933.  W. J. BROUGHTON  1,909,568
AUTOMATIC POSITIVE AND CONE CLUTCH
Filed April 29, 1929  2 Sheets-Sheet 1
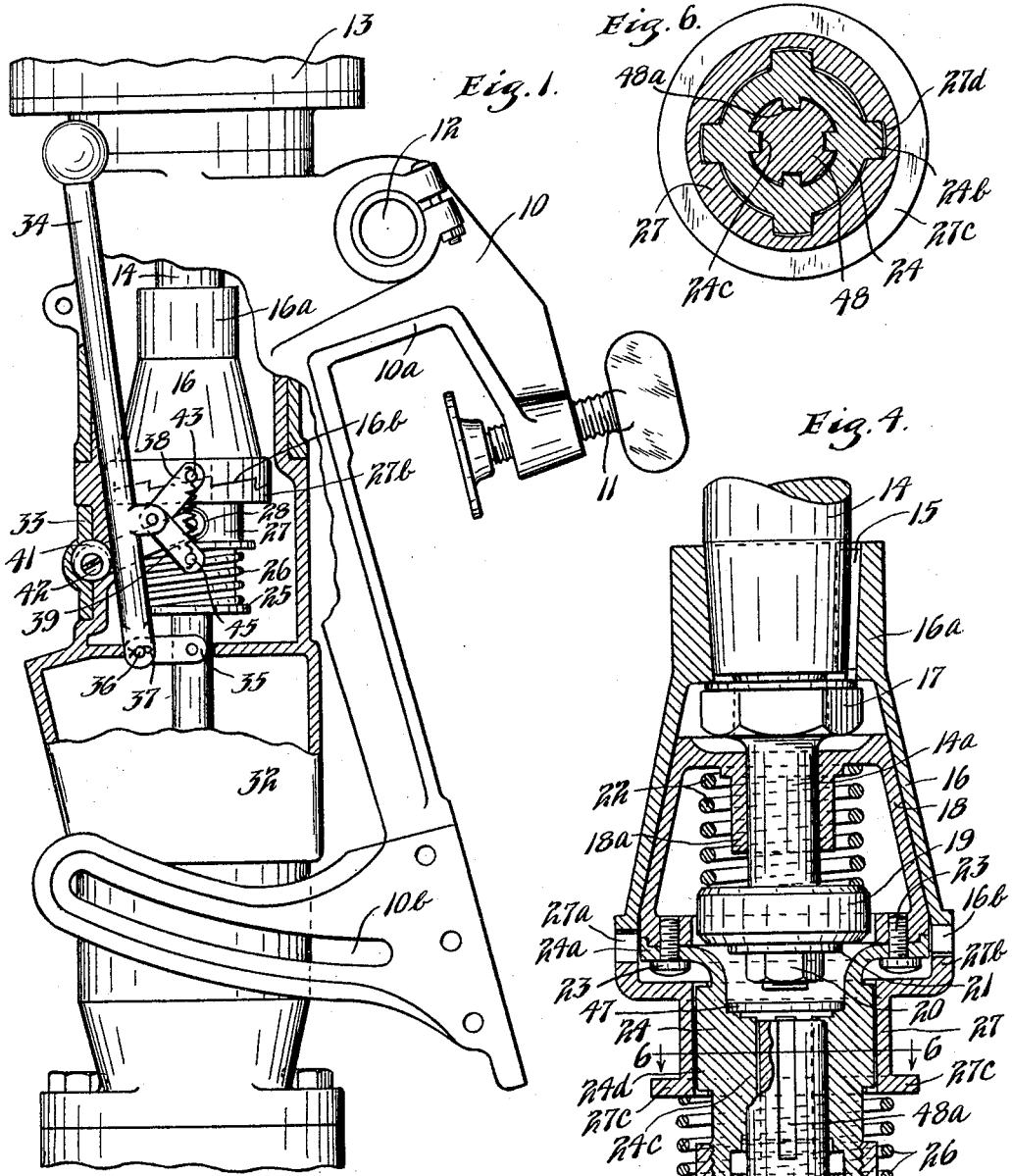
INVENTOR.
WILLIAM J. BROUGHTON.
BY HIS ATTORNEYS.
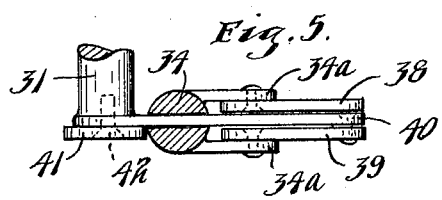

May 16, 1933. W. J. BROUGHTON 1,909,568
AUTOMATIC POSITIVE AND CONE CLUTCH
Filed April 29, 1929 2 Sheets-Sheet 2
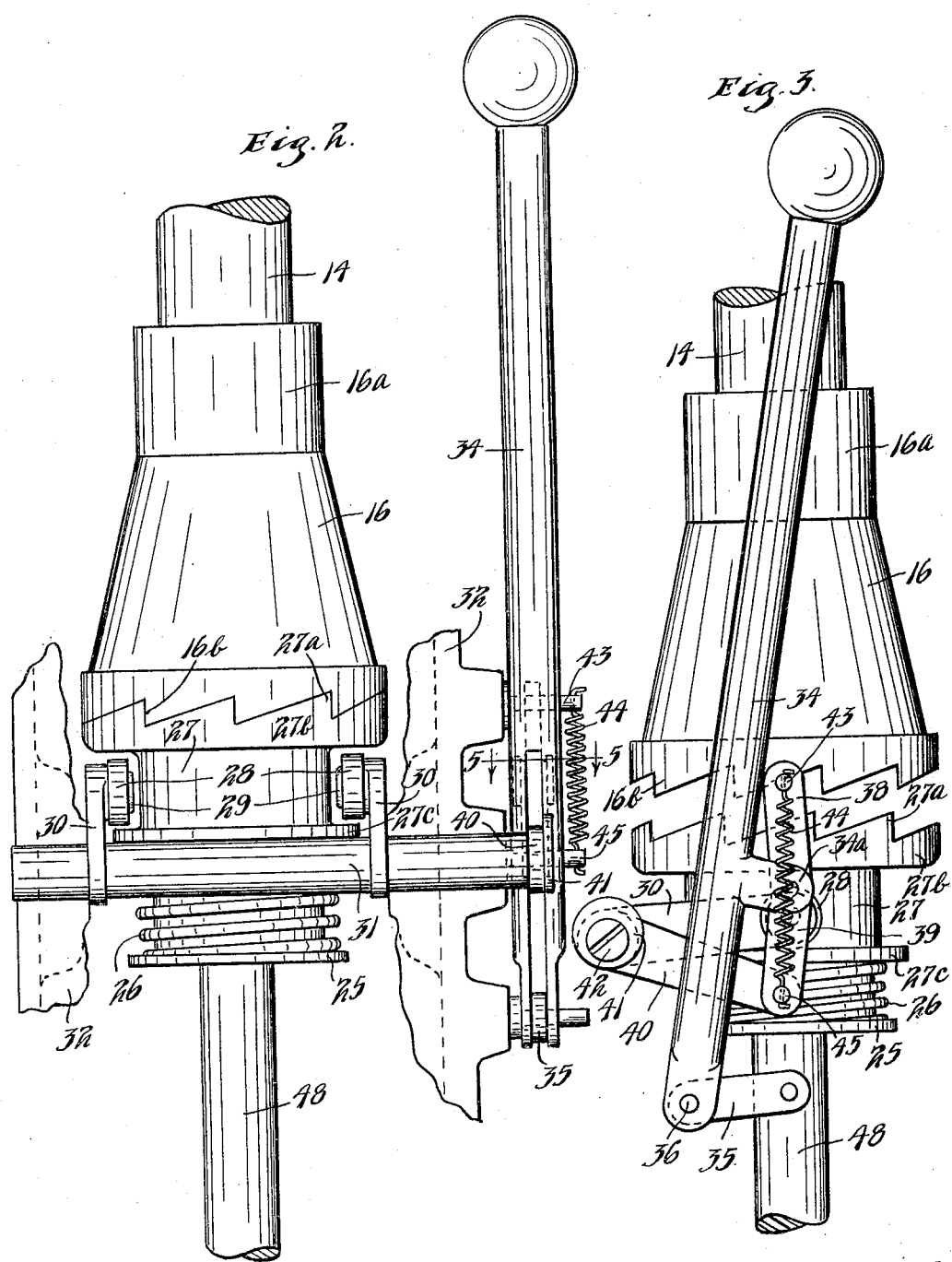
INVENTOR.
WILLIAM J. BROUGHTON.
BY HIS ATTORNEYS.

Patented May 16, 1933

1,909,568

UNITED STATES PATENT OFFICE

WILLIAM J. BROUGHTON, OF ST. PAUL, MINNESOTA

AUTOMATIC POSITIVE AND CONE CLUTCH

Application filed April 29, 1929. Serial No. 358,994.

This invention relates to a clutch mechanism, and while the invention is applicable to many different structures, it particularly is designed to be used with an outboard motor and propeller such as now commonly used on small boats in order to drive them by power. As is well known, such motors with the propellers attached, are carried in a bracket which is quickly and easily attachable and detachable from the boat. It has not been customary to provide such motors with a clutch which can be held disengaged and then engaged with the propeller after the engine has been started. It is customary to have the propeller shaft connected directly to the engine shaft so that the boat must always be kept headed in the right direction and be ready to move in the right direction when the engine starts. As is also well known to users of such engines, they occasionally give trouble in starting. Accidents have also occurred on account of the fact that the boat starts to move suddenly when the motor is started, and accidents have been known to occur where the force of starting tore the rear end out of the boat.

It is an object of this invention, therefore, to provide an outboard structure of motor and propeller in which a clutch is interposed between the motor and propeller, which clutch can be readily disengaged by the operator of the engine and engaged after the engine is started.

It is a further object of the invention to provide a structure of outboard motor and propeller in which a positive clutch is interposed between the engine driven shaft and the propeller shaft, together with means for easily disengaging said clutch and holding the same disengaged and automatic means for moving the clutch to engaged position.

It is still another object of the invention to provide an outboard motor structure in which a positive and a friction clutch are positioned between the engine driven shaft and the propeller shaft together with means for disengaging the positive clutch and subsequently disengaging the friction clutch and holding the same in disengaged position, resilient means being provided which normally tend to urge the clutches into engaged position.

These and other objects and advantages of the invention will be fully set forth in the following description made in connection with the accompanying drawings, in which like reference characters refer to similar parts throughout the several views, and in which:—

Fig. 1 is a view partly in side elevation and partly in vertical section showing the bracket for the motor and propeller structures and the clutch connecting the engine and propeller shafts;

Fig. 2 is a view in front elevation of the clutch mechanism showing the clutch engaged;

Fig 3 is a view in side elevation of the clutch mechanism showing the clutch disengaged, Fig. 4 is a central vertical section through the clutch mechanism, Figs. 2 to 4 being shown on an enlarged scale;

Fig. 5 is a horizontal section taken on line 5—5 of Fig. 2, and

Fig. 6 is a horizontal section taken on line 6—6 of Fig. 4.

Referring to the drawings, a bracket 10 is shown having a clamp-forming portion 10a in which is inserted a clamp screw 11 adapted to clamp the device onto the rear of a boat. Said bracket is adjustable about a pivot 12 and has a slot 10b providing for angular adjustment to properly position the device. A portion of the motor frame is shown at 13 and the motor driven shaft or crank shaft is shown as 14. Shaft 14 is tapered at its lower end and has secured thereto by the key 15 the hub 16a of an external clutch member 16, said hub being fitted to the lower end of shaft 14. The lower end of shaft 14 below hub 16a is reduced and threaded to receive a nut 17 and is further reduced to provide an extension 14a. An internal friction clutch member 18 which in the embodiment of the invention illustrated is formed as a cone is disposed within member 16 and arranged to engage the interior conical surface of member 16. Member 18 has a hub portion 18a bored to receive and be slidable upon extension 14a of shaft 14. Shaft 14 has a ball thrust bearing 19 thereon below hub 18a and said shaft below bearing 19 is threaded to receive a nut 20, a washer 21 being interposed between member 19 and nut 20. A compression coiled spring 22 surrounds shaft portion 14a and hub 18a bearing at its upper end against the upper end of member 18 and at its lower end against member 19. Member 18 has an inwardly extending flange at its lower end and has a circumferential recess at its lower edge. Said flange is connected by a plurality of headed screws 23 to the flange 24a of a clutch operating member or sleeve 24, flange 24a having a small projecting flange fitting in the recess in the edge of member 18. Member 24 is exteriorly threaded at its lower end to receive a flanged nut 25 which is surrounded by a compression coiled spring 26 which rests at its lower end on the flange at the bottom of member 25. The lower end of member 16 is provided with a plurality of ratchet shaped teeth 16b. These teeth are adapted to cooperate with similarly shaped teeth 27a formed on the flange 27b of the member 27 which surrounds member 24 and has a flange 27c at its lower end. Member 27 is operated to disengage the clutch and a pair of clutch fork rollers 28 are provided adapted to be disposed in the groove in member 27 between the upper portion of member 27 and flange 27c. Clutch rollers 28 are carried on headed studs 29 which in turn are mounted in the ends of arms 30 secured to a shaft 31 suitably journaled in bearings in the housing 32 which surrounds the clutch member, said bearings being provided with a cap member 33.

A lever 34 is provided for operating the clutches, said lever being bifurcated at its lower end and receiving between the spaced portions thereof one end of a link 35 pivoted to said lever by a pin 36 held in place by the split key 37. Lever 34 has spaced laterally projecting lugs 34a to which are respectively pivoted the ends of links 38 and 39. The link 39 is pivoted at its lower end to the end of an arm 40 which is rigidly secured to the end of shaft 31. A disk 41, eccentric to shaft 31 is secured to the outer side of arm 40 by a headed bolt 42. The upper link 38 is pivoted at its upper end on a pin 43 projecting from the housing 32. A tensile spring 44 extends between pin 43 and a pin 45, which latter forms the pivot between link 39 and arm 40. The portion of member 27 embracing member 24 has a plurality of radially disposed grooves 27d therein, shown as four in number, into which project ribs 24b extending from member 24, said ribs being longitudinally movable in said grooves. Member 24 also has radially and inwardly projecting ribs 24c which extend into grooves 48a of a shaft 48 which extends downwardly and is connected to the propeller driving mechanism. Members 27 and 24 and shaft 48 are thus connected for common rotation but are longitudinally slidable.

Member 24 is bored at its lower end to receive the end of a tubular fixed casing 46, on which it is slidale. A disk 47 is fitted into the bottom of an enlarged portion adjacent the upper end of member 24 as shown in Fig. 4 and prevents grease, with which cone chamber 18 is filled, from running downward.

In operation when the motor is to be started the clutch will be disengaged and for this purpose lever 34 will be swung from the position shown in Fig. 1 to that shown in Fig. 3. It will be seen that the links 38 and 39 constitute a toggle mechanism and the lever is thrown over far enough to move the toggles slightly past their straightened position or dead center. The lever will remain in this position, spring 44 at this time being distended. So straightening the toggle pushes down on link 39 and arm 40, oscillating shaft 31. This swings arms 30 and rollers 28 act on member 27 to depress the same. Member 27 is depressed against the pressure of spring 26 and teeth 27a are withdrawn from the teeth 16b. When these teeth are engaged a positive clutch is formed and it will be seen that this clutch is first disengaged by movement of lever 34. As member 27 moves downward, the teeth 16b and 27a are disengaged, spring 26 will be compressed and further movement of member 27 will depress member 25. Members 25 and 24 move downward, member 24 sliding on casing 46 and this movement withdraws cone 18 from engagement with member 16 compressing spring 22. The clutch is now entirely disengaged and lever 34 will remain in position with the clutch disengaged. The engine can now be started and after it is running the operator will swing lever 34 to the position shown in Fig. 1. Spring 22 will move cone 18 upward and the same will be engaged with member 16 and will be driven as said members come into engagement. The friction clutch is now engaged and picks up the load. Rotation of cone 18 of course turns members 24 and 27 and shaft 48. After cone 18 is engaged spring 26 will move member 27 upward and the teeth or jaws 16b and 27a will be engaged and the positive clutch will then be engaged and come into operation. Member 27 will be rotating with member 16 and the clutch teeth 16b and 27a will come into engagement without any appreciable shock or clashing. Lever 34 is moved to the left as shown in Fig. 1 until it engages with the edge of disk 41. The spring 44 is under some tension when the lever is in this position and tends to move the ends of links 38 and 39 together and move the lever to the left as shown in Fig. 1 so that it will remain in position against disk 41. Disk 41 can be adjusted and it will be adjusted to such a position that when lever 34 engages the same, rollers 28 will be held substantially in the center of the groove in member 27 and out of engagement with member 27 at the top or bottom of the groove. These rollers therefore will not be engaged while the boat is being operated and will not be continuously operated, thus eliminating wear on the rollers. It will be obvious that the clutch may be readily disengaged when desired by the operator's swinging lever 34. Cone 18 is moved and spring 22 compressed when the toggle, comprising links 38 and 39, is almost straightened. They are thus acting at the best advantage and lever 34 is easily moved.

From the above description it is seen that applicant has provided a very simple and efficient structure of outboard motor and propeller comprising a clutch mechanism between the motor shaft and propeller shaft which can be readily disengaged and moved into engagement and can be held in disengaged position. With the described structure the operator need not give his attention to positioning or steering the boat until after the engine is in operation. After he has gotten the engine running he can throw in the clutch at any desired time and start the boat moving. This is a great advantage in such a structure and one which will eliminate much trouble and many accidents. The device has been amply demonstrated in actual practice and found to be very successful and efficient.

It is apparent that the clutch mechanism disclosed could be used on outboard motors having only the one way clutch or on such motors equipped with reversing gears. The clutch mechanism could also be used on inboard motors of the said two types. It is obvious that the clutch mechanism could also be used on some automobiles, such as small sport cars with no reverse, of the type using motorcycle engines. The clutch could also be used on tractors with differential or double drives, such as those which disengage on one side while turning, or on accessory drives for air craft, both of the heavier than air and lighter than air types. The clutch could also be used on windmills and various kinds of industrial machinery.

It will, of course, be understood that various changes may be made in the form, details, proportions and arrangement of the parts, without departing from the scope of applicant's invention, which, generally stated, consists in a device capable of carrying out the objects above set forth, in the novel parts and combinations of parts disclosed and defined in the appended claims.

What is claimed is:—

1. A device of the class described having in combination, a driving shaft, a hollow frusto conical member secured to said shaft, a second hollow frusto conical member having an upper closed end and an outer surface frictionally engageable with the inner surface of said first member, said shaft having a reduced terminal portion extending through said closed end and terminating in said second member, means in said second member urging the same into engagement with said first member, the conical wall of said second member surrounding said means in spaced relation thereto, and said means engaging the upper closed end of said second member at location adjacent the inner end of said first member, a driven shaft spaced longitudinally from said driving shaft, a member keyed to said driven shaft but slidable thereon and secured at one end to said second frusto conical member and having a flange at its other end, a compression coil spring surrounding said last mentioned member bearing against said flange, a sleeve slidable on said last mentioned member engaging the other end of said spring, and means for moving said sleeve to compress said last mentioned spring and cause said last mentioned member to move said second frusto conical member away from said first frusto conical member.

2. A device of the class described having in combination a driving shaft, a hollow frusto conical member secured to said shaft, and having clutch teeth at its large end, a second hollow frusto conical member having an external surface engageable with the interior surface of said first mentioned member, a driven shaft spaced longitudinally from said driving shaft, means between said shafts forming a lubricant containing chamber of said second frusto conical member, a member keyed to but slidable on said driven shaft, a sleeve slidable on said member and keyed thereto, having clutch teeth at one end engageable with the clutch teeth on said first mentioned member, means for moving said sleeve to withdraw said clutch teeth and yielding means urging said clutch teeth and said conical members into engagement, said means for moving said sleeve to withdraw said clutch teeth being also adapted to move, said last mentioned member to disengage said frusto conical members when said teeth are withdrawn.

3. A device of the class described having in combination a driving shaft, a driven shaft, clutch means for connecting said shafts, a member having a groove therein to operate said clutch means, rollers disposed in said groove, arms carrying said rollers, and a manually operable lever for swinging said arms to move said member and disengage said clutch, a shaft at one side of said shafts to which said arms are secured, an arm secured to said last mentioned shaft, a link pivoted to the end of said last mentioned arm, a second link pivoted at one end about a fixed axis, said links having adjacent ends to which said lever is pivotally connected, said links thus forming a toggle operated by said lever.

4. The structure set forth in claim 3, and an adjustable member on said last mentioned shaft adapted to engage and position said lever with said rollers out of contact with said groove.

5. A device of the class described having in combination a driving shaft, a frusto conical member secured thereto, a second frusto conical member frictionally engageable with said first mentioned member, a driven shaft longitudinally spaced from said driving shaft, a member secured to but slidable on said driven shaft and secured to said second frusto conical member, means urging said frusto conical members into engagement, means for moving said last mentioned member to separate said frusto conical members, and a sealing member disposed in said last mentioned member between said shafts to form a lubricant containing chamber in said second frusto conical member and said last mentioned member.

6. A device of the class described having in combination, a driving shaft, a hollow frusto conical member secured to said shaft, a second hollow frusto conical member housed by the member first mentioned and having an upper closed end and an outer surface frictionally engageable with the inner conical surface of said first member, said shaft having a reduced terminal portion extending through said closed end and terminating within said second member, resilient means supported by said terminal portion and urging said second member into engagement with said first member, a driven shaft spaced longitudinally from said driving shaft, means between said shafts forming a lubricant containing chamber of said second frusto conical member, a member surrounding said driven shaft and keyed thereto to be slidable thereon, said last mentioned member being secured to said second frusto conical member and having a flange at its end spaced from said second frusto conical member, resilient means surrounding said last mentioned member and bearing against said flange, a sleeve slidable on said last mentioned member and engaging said resilient means, interengageable clutch teeth on said sleeve and said first frusto conical member, and means for moving said sleeve to act upon said last mentioned resilient means, first causing said interengageable clutch teeth to be disengaged and later causing said last mentioned member to move said second frusto conical member away from said first frusto conical member.

In testimony whereof I affix my signature.

WILLIAM J. BROUGHTON.